R. SAMPSON.
PUNCTURE CLOSURE FOR PNEUMATIC TIRES AND THE LIKE.
APPLICATION FILED APR. 21, 1910.
1,017,809.
Patented Feb. 20, 1912.
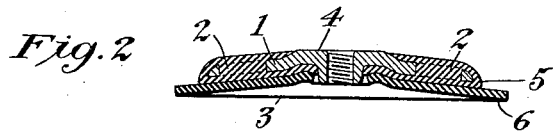
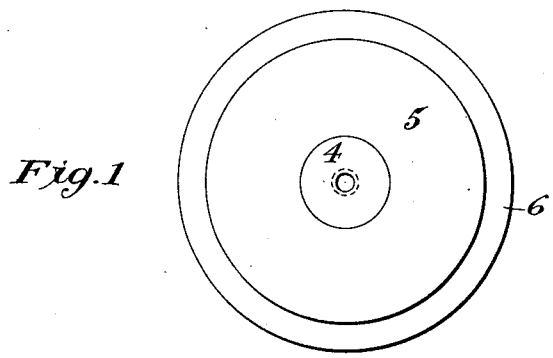
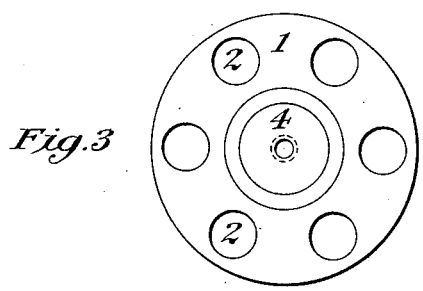
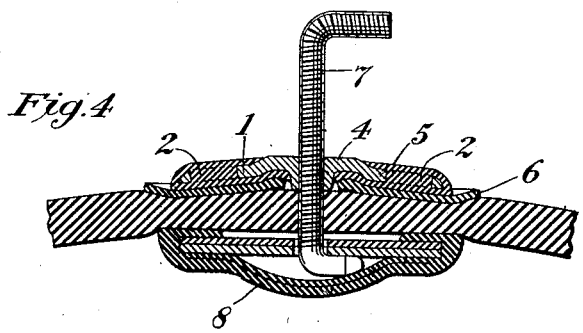
Witnesses:
William H. Mohr
Howard M. Cong
Inventor
Robert Sampson
By his Attorney
Andrew Wilson
COLUMBIA PLANOGRAPH CO., WASHINGTON, D. C.

UNITED STATES PATENT OFFICE.

ROBERT SAMPSON, OF MONTREAL, QUEBEC, CANADA.

PUNCTURE-CLOSURE FOR PNEUMATIC TIRES AND THE LIKE.

1,017,809.      Specification of Letters Patent.      Patented Feb. 20, 1912.

Application filed April 21, 1910. Serial No. 556,896.

*To all whom it may concern:*

Be it known that I, ROBERT SAMPSON, a subject of the King of Great Britain, residing at Montreal, Quebec, Canada, have invented certain new and useful Improvements in Puncture-Closures for Pneumatic Tires and the Like, of which the following is a specification.

My improvements relate to nuts which are threaded so as to coöperate with a threaded shank, my invention being particularly applicable for use upon the threaded shanks of puncture closers for pneumatic tires, such, for instance, as are shown in Letters Patent of the United States issued to me June 8, 1909, and numbered 923,896.

In the drawings, Figure 1 is a top view and Fig. 2 is a cross-sectional view of one of my improved nuts, Fig. 3 is a plan view of the metal plate, and Fig. 4 is a cross-sectional view of one of my improved nuts applied to a puncture closer for pneumatic tires.

All the figures are upon an enlarged scale, and the same parts are in each figure designated by corresponding reference letters.

A thin metallic disk, 1, is slightly dished, and is provided with openings or holes as 2, 2, so as to give it a skeleton character; and it also has a threaded neck, 3, projecting from the center of its concave face and an annular embossment around the center of its convex face. The disk 1 is surrounded by an elastic covering 5 of rubber or similar material, which also fills the holes or openings 2, 2, in the body of the disk, and, preferably, covers it entirely with the exception of the neck 3 and embossment 4. To the concave side of this rubber covered disk I preferably attach a piece of textile material, as 6, which projects slightly beyond the periphery of the disk and is intimately united to the rubber covering.

To form a complete sealing device, the composite nut is used in connection with any suitable form of interior sealing member, the form shown being that of my Patent #923,896, and comprising a metal head plate 9, provided with a central opening through which the shank passes, and a rubber covering 8 applied over the head plate. In use, in a puncture closer for pneumatic tires, this composite nut is clamped down upon the exterior of the tire, as by the rotation of the threaded shank 7, in the well known manner, the threaded neck 3 affording a long grip for the threaded shank 7 so that the nut can be tightly clamped down without danger of the thread stripping, while the embossment 4 stiffens and strengthens the central part of the nut and enables it to withstand the wear of use. The textile and rubber covering on the under side of the nut prevents the thin edges of the metallic disk from cutting into the material of the pneumatic tire; the openings in the disk 1 serve to lighten the disk, make it less rigid and afford gripping seats for the rubber 5, so that it shall be intimately bound to the disk and shall not be liable to be stripped or torn from the openings in or from the under side of the nut.

The rubber elements of the nut deaden the sound when the nut strikes upon a hard pavement as the wheel turns in riding, my improved nut being practically noiseless; while the subdued color of the composite nut corresponds with that of the pneumatic tire, and makes the nut inconspicuous, so that attention is not attracted to the repair in the tire.

The character of the skeleton forming openings in the metallic disk and other details may be changed without departing from the spirit of my invention.

Having thus described my invention, what I claim and desire to secure by Letters Patent of the United States, is:—

A puncture closure for pneumatic tires and the like embodying, in combination with an interior sealing member, an exterior clamping member comprising a thin, concavo-convex, skeletonized metal disk provided with a centrally-disposed, interiorly-threaded neck, a shield of elastic material surrounding said disk and extending through the skeletonizing openings therein, and a shank secured to said interior member and engaging the threaded neck of the exterior member.

ROBERT SAMPSON.

Witnesses:
    HOWARD M. ROWE,
    WILLIAM H. MOLER.